United States Patent
Antoine

(10) Patent No.: US 10,696,389 B2
(45) Date of Patent: Jun. 30, 2020

(54) SWASH PLATE SYSTEM FOR HELICOPTER ROTOR

(71) Applicant: Sagita SA, Wandre (BE)

(72) Inventor: Hubert Antoine, Esneux (BE)

(73) Assignee: SAGITA SA, Wandre (BE)

( * ) Notice: Subject to any disclaimer, the term of this patent is extended or adjusted under 35 U.S.C. 154(b) by 96 days.

(21) Appl. No.: 16/091,528

(22) PCT Filed: Mar. 9, 2017

(86) PCT No.: PCT/EP2017/055544
§ 371 (c)(1),
(2) Date: Oct. 5, 2018

(87) PCT Pub. No.: WO2017/174288
PCT Pub. Date: Oct. 12, 2017

(65) Prior Publication Data
US 2019/0127058 A1    May 2, 2019

(30) Foreign Application Priority Data

Apr. 7, 2016   (BE) .................................. 2016/5240

(51) Int. Cl.
*B64C 11/32*      (2006.01)
*B64C 27/605*    (2006.01)
(Continued)

(52) U.S. Cl.
CPC .......... *B64C 27/605* (2013.01); *B64C 11/306* (2013.01); *B64C 11/32* (2013.01);
(Continued)

(58) Field of Classification Search
CPC ... B64C 27/10; B64C 27/605; B64C 27/7205; B64C 27/80; B64C 11/306; B64C 11/32
See application file for complete search history.

(56) References Cited

U.S. PATENT DOCUMENTS 2,601,090 A * 6/1952 Burwell .................. B64C 27/54
                                                                  416/115
2,665,859 A * 1/1954 Papadakos .............. B64C 27/26
                                                                  244/7 R (Continued)

FOREIGN PATENT DOCUMENTS

EP        0162773 A1   11/1985
EP        1990275 B1   12/2008

(Continued)

*Primary Examiner* — Ninh H. Nguyen
(74) *Attorney, Agent, or Firm* — Leydig, Voit & Mayer, Ltd.

(57) ABSTRACT

A device for controlling a collective pitch and a cyclic pitch of rotor blades of a rotoreraft of a direct turbine driven type and contra-rotating coaxial rotor type (DTDR) includes: a lower rotor and an upper rotor that are mounted concentrically on a shared rotor shaft; a first plate, that is not rotatable, fastened to a structure of the rotorcraft and connected to an actuator that communicates collective pitch and cyclic pitch controls to it, the first plate being mounted so as to be movable in translation along the shared rotor shaft and to oscillate relative to the shared rotor shaft, via a lower ball joint mechanism; and a second plate, that is rotatable, housed on the lower ball joint mechanism so as to be always parallel to the first plate, the second plate being driven in rotation by a member connecting it to the lower rotor.

5 Claims, 3 Drawing Sheets

(51) Int. Cl.
 *B64C 27/80* (2006.01)
 *B64C 27/10* (2006.01)
 *B64C 27/72* (2006.01)
 *B64C 11/30* (2006.01)

(52) U.S. Cl.
 CPC .............. *B64C 27/10* (2013.01); *B64C 27/72* (2013.01); *B64C 27/80* (2013.01)

(56) References Cited

U.S. PATENT DOCUMENTS

| | | | |
|---|---|---|---|
| 2,835,331 A * | 5/1958 | Ryan | B64C 27/54 |
| | | | 416/129 |
| 3,417,825 A | 12/1968 | Ramme | |
| 3,771,924 A * | 11/1973 | Buchstaller | B64C 27/54 |
| | | | 416/121 |
| 4,589,611 A | 5/1986 | Ramme et al. | |
| 4,598,887 A | 7/1986 | Jordan | |
| 4,630,998 A | 12/1986 | Leman et al. | |

FOREIGN PATENT DOCUMENTS

| | | |
|---|---|---|
| FR | 2532273 A1 | 3/1984 |
| FR | 2890375 A1 | 3/2007 |
| WO | 2009010644 A2 | 1/2009 |

* cited by examiner

SWASH PLATE SYSTEM FOR HELICOPTER ROTOR

CROSS-REFERENCE TO PRIOR APPLICATIONS

This application is a U.S. National Phase application under 35 U.S.C. § 371 of International Application No. PCT/EP2017/055544, filed on Mar. 9, 2017, and claims benefit to Belgian Patent Application No. BE 2016/5240, filed on Apr. 7, 2016. The International Application was published in French on Oct. 12, 2017 as WO 2017/174288 under PCT Article 21(2).

FIELD

The present invention relates to the lift and thrust control device in the case of a rotor of a rotorcraft, such as a helicopter or gyroplane, with direct turbine driving.

BACKGROUND

In the type of rotor called jet-driven rotor, the driving force of the rotor is created by the expansion and ejection of pressurized gas and not by a mechanical device connected to the fuselage of the aircraft. Such an aircraft has two contra-rotating rotors, the gyroscopic momentums of which cancel one another out, which makes it possible to avoid using a tail rotor. Piloting is simplified and the reliability of the aircraft is increased.

It is well known that the variations in lift and traction provided by a primary helicopter rotor are ensured on the one hand by uniformly modifying the angle of attack (or the pitch) of the blades owing to the collective pitch control and on the other hand by modifying the pitch of each of the blades individually and cyclically, owing to the cyclic pitch control.

The essential element allowing the pilot to transmit the collective pitch and cyclic pitch controls to the blades of the primary rotor is the swash plate.

According to one example swash plate among others in the prior art, the latter comprises two annular plates assembled by a ball bearing and mounted concentrically around the shaft of the primary rotor, which is driven in rotation by the motors via the gearbox and ends with a hub on which the blades are articulated. The two superimposed plates slide and roll around the shaft of the rotor. The lower plate is stationary relative to the structure of the helicopter and the upper plate rotates with the rotor. Pitch links, each connected to a blade and varying its angle of attack, are fastened on the upper plate. The lower plate, tilted and/or moved along the axis of the rotor by the controls, owing to a ball joint with bearings, transmits these movements to the upper plate to which it is connected.

The collective (or general) pitch control then corresponds to an axial translation of the set of the two plates, obtained by axial sliding of the articulation mechanism along the shaft of the rotor and the cyclic pitch control corresponds to an overall tilt of the two plates relative to the shaft of the rotor, owing to said mechanism.

Among the patents or patent applications describing swash plate mechanisms, we may for example cite: EP 0 162 773 A1, WO 2009/010644 A2, etc. Document FR 2 890 375 A1 discloses a rotary wing control assembly comprising at least two coaxial and contra-rotating rotors, each fastened on a rotor shaft and associated with a swash plate, each swash plate consisting of two elements rotating relative to one another, each swash plate comprising one of its rotary elements subject in rotation to the associated rotor and each swash plate further being provided with means allowing its tilt relative to its associated rotor as well as means for transmitting its tilt in the form of lead inclination of the blades of its associated rotor, the control assembly comprising means continuously imposing a same tilt of two swash plates, characterized in that it comprises yaw control means able to impose a translational movement on one of the rotor shafts relative to another rotor shaft of a set of two rotors in order to vary the torque applied to at least one of the rotors.

Furthermore, a helicopter rotor drive system is known, called Direct Turbine Driven Rotor (DTDR), which is for example described in document EP 1 990 275 B 1, U.S. Pat. No. 3,417,825 A, FR 2 532 273 A1, U.S. Pat. No. 4,589,611 A, etc. The system is characterized by the presence of two contra-rotating coaxial primary rotors mounted on a vertical axis: an upper rotor and a lower rotor.

These two rotors are driven by contra-rotating coaxial turbines having no stage fixed to the fuselage. The motor torque of one turbine is then compensated exactly by that of the other turbine.

The corollary to this configuration is that the rotation speeds of the two rotors are not necessarily equal, these speeds being determined by the drag resistance of the blades to the respective motor torques of the turbines of the two rotors, which are equal.

If, for example, the blades of a first rotor have a smaller angle of attack and therefore a smaller drag coefficient than those of the second rotor, this first rotor will rotate faster than the second rotor such that the resistant torques of the two rotors balance one another out.

Experience shows that it is desirable for the two DTDR turbine rotors to have respective rotation speeds as equal as possible, in absolute value. Indeed, the powers of the two turbines are then equal, their performance is optimal and the gyroscopic torques of the two rotors cancel one another out.

Experience also shows that, to achieve this, it is necessary to give approximately 1° more in angle of attack to the blades of the lower rotor relative to the upper rotor when the aircraft is at nearly maximum power, in stationary flight. For example, an angle of attack of 9° will be given for the upper rotor and 10° for the lower rotor.

Conversely, at zero power in autorotation, tests show that the situation is reversed: it is necessary to give about 1° more in angle of attack to the blades of the upper rotor relative to those of the lower rotor. For example, 3° of angle of attack will be given for the upper rotor and 2° for the lower rotor.

These values are indicative and in particular depend on the geometry of the rotor.

These variable angles of attack are managed by the general pitch control: in the example above, there will be a travel of 9°−3°=6° on the general pitch of the upper rotor and a travel of 10°−2°=8° on the general pitch of the lower rotor.

For the intermediate levels of general pitch, a linear variation between the limit values of each rotor is appropriate to retain more or less equal rotation speeds.

Also superimposed on the general pitch, as mentioned above, is a cyclic pitch oscillating around zero, and which gives the blades a variable angle of attack in azimuth and the rotor a control function in pitch and roll. To that end, the swash plate controlling the angle of attack of the blades is mounted on a ball joint that allows it to tilt in order to give cyclic pitch and to translate along the axis of the rotor to give general pitch.

In the present case of the DTDR rotor, it is important that, irrespective of the general pitch lift, the cyclic pitch variation is the same for both rotors, so that these two rotors tilt with the same angle, failing which they would be likely to meet.

The DTDR rotor must therefore have a variable general pitch from one rotor to the other, while having the same cyclic pitch on both rotors.

A few contra-rotating rotor systems are already known, for example the Kamov system, which have a differential general pitch mechanism adjustable during flight from one rotor to the other. This mechanism acts on the distance between the two swash plates via a rod linkage housed inside the mast and makes it possible to differentiate the general pitch of the rotors in order to control the yaw of the aircraft.

SUMMARY

In an embodiment, the present invention provides a device for controlling a collective pitch and a cyclic pitch of rotor blades of a rotorcraft of a direct turbine driven type and contra-rotating coaxial rotor type (DTDR), comprising: a lower rotor and an upper rotor that are mounted concentrically on a shared rotor shaft; a first plate, that is not rotatable, fastened to a structure of the rotorcraft and connected to an actuator configured to communicate collective pitch and cyclic pitch controls to it, the first plate being mounted so as to be movable in translation along the shared rotor shaft and to oscillate relative to the shared rotor shaft, via a lower ball joint mechanism; a second plate, that is rotatable, housed on the lower ball joint mechanism so as to be always parallel to the first plate, the second plate being driven in rotation by a member connecting it to the lower rotor and being connected to a pitch control lever of each blade of the lower rotor by a lower connecting rod; a third plate and a fourth plate, both rotatable and being driven in rotation by a member connecting them to the lower rotor or to the upper rotor and housed on an upper ball joint mechanism so as to be always parallel to one another, the fourth plate being connected to a pitch control lever of each blade of the upper rotor by an upper connecting rod; means for ensuring that the third plate is always parallel to the second plate so that the third plate receives a same translation and a same tilt as the second plate by the respective collective pitch and cyclic pitch controls, wherein a length of the pitch control levers of the blades of the lower rotor is smaller than a length of the pitch control levers of the blades of the upper rotor.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
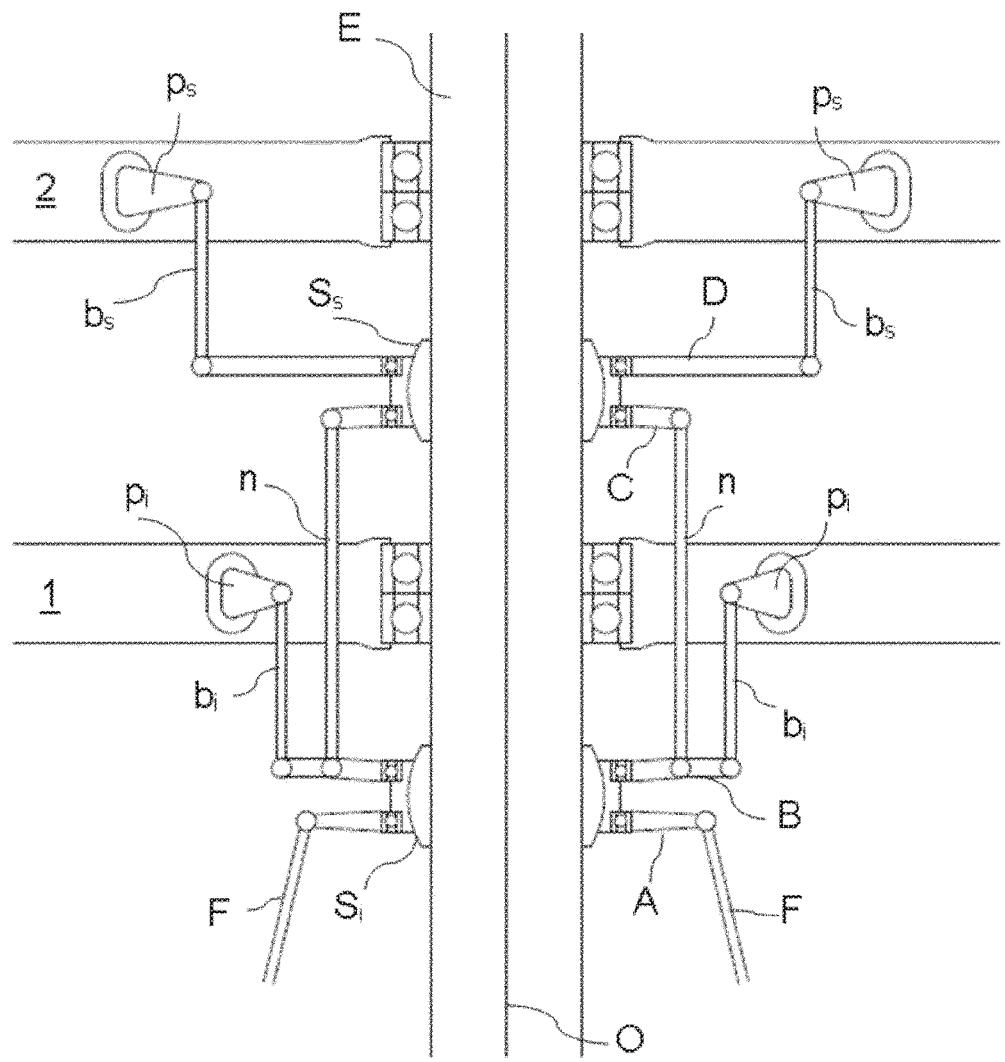
FIG. 1 shows a general axial sectional view of one embodiment of the system for driving a helicopter rotor according to the present invention.

In an embodiment, the present invention provides, in the case of a direct turbine driven helicopter rotor (DTDR) system, contra-rotating coaxial rotors, the respective rotation speeds of which are as equal as possible, in absolute value.

In particular, the present invention provides a swash plate device designed to allow the DTDR rotor to have a general pitch variable from one rotor to the other, while keeping the same cyclic pitch on both rotors.

The present invention relates to a device for controlling the collective pitch and the cyclic pitch of the rotor blades of a rotorcraft, of the direct turbine driven type and contra-rotating coaxial rotor type (DTDR), said device comprising a lower rotor and an upper rotor that are concentrically mounted on a shared rotor shaft as well as a first plate, not rotating, fastened to the structure of the rotorcraft and connected to an actuator communicating collective pitch and cyclic pitch controls to it, mounted on the one hand movable in translation along said shaft and on the other hand oscillating relative to said shaft, via a lower ball joint mechanism, a second plate, rotating, also housed on the lower ball joint mechanism so as to be always parallel to the first plate, driven in rotation by a member connecting it to the lower rotor and connected to a pitch control lever of each of the blades of the lower rotor by a lower connecting rod, said device also comprising a third plate and a fourth plate, both rotating, driven in rotation by a member connecting them to the lower rotor or to the upper rotor and housed on an upper ball joint mechanism so as to be always parallel to one another, the fourth plate being connected to a pitch control lever of each of the blades of the upper rotor by an upper connecting rod, said device comprising means for ensuring that the third plate is always parallel to the second plate, i.e., that the third plate receives the same translation and the same tilt as the second plate by the respective collective pitch and cyclic pitch controls, characterized in that the length of the pitch control levers of the blades of the lower rotor is smaller than the length of the pitch control levers of the blades of the upper rotor.

According to preferred embodiments of the invention, the device for controlling the collective pitch and the cyclic pitch further comprises at least one of the following features or an appropriate combination thereof:

- the means for ensuring that the third plate is always parallel to the second plate comprise a plurality of connecting rods equal in length between the second plate and the third plate, and which are parallel to the shared rotor shaft;
- the number of connecting rods is at least equal to 3;
- alternatively, the third plate is connected to the pitch control lever of each of the blades of the lower rotor by a lower connecting rod;
- the device comprises means for ensuring a different collective pitch variation on the blades of the upper rotor and on the blades of the lower rotor;
- for a given travel imposed by the collective pitch control, the ratio between the pitch control lever arm of the blades of the upper rotor and the pitch control lever arm of the blades of the lower rotor is greater than one, which corresponds to a maximum angular variation of the pitch of the lower rotor greater than the maximum angular variation of the pitch of the upper rotor.

One embodiment of the invention is shown in FIG. 1.

The assembly of swash plates is made up of four plates, or respectively from bottom to top, a first plate A, a second plate B, a third plate C and a fourth plate D, all four mounted sliding on the shaft or the mast E with axis O of the DTDR rotor and which all have the same translational movement for the general pitch and the same tilting movement for the cyclic pitch.

The first plate A does not rotate, it is stationary relative to the shaft of the aircraft and receives the flight controls F for the general pitch and the cyclic pitch: as is known by one skilled in the art, the first plate A translates along the axis O for the general pitch and is tilted according to the requested cyclic pitch amplitude and direction, owing to a ball joint Si.

The second plate B is housed on the same ball joint Si as the plate A and is therefore always parallel to A. It rotates with the lower rotor 1 and controls the pitch levers Pi thereof, via the respective connecting rods bi, parallel to the axis of the rotor.

The second plate B is further connected to the third plate C as follows. The third plate C, housed on a ball joint Ss, is connected to the second plate B by 3 connecting rods n of equal length and parallel to the axis of the rotor. Thus, the third plate C rotates with the lower rotor and is always parallel to the plate B, irrespective of the tilt of the latter. The third plate C therefore receives the same tilt and the same translation as the second plate B.

The fourth plate D is housed on the same ball joint Ss as the plate C and is therefore always parallel to the plate C. It rotates with the upper rotor 2 and controls the pitch levers ps thereof, via the respective connecting rods bs, parallel to the axis of the rotor.

One alternative for this arrangement is to control the levers of the lower rotor via the third plate C and not via the second plate B, but this changes nothing about the principle of the invention.

Figure 2:
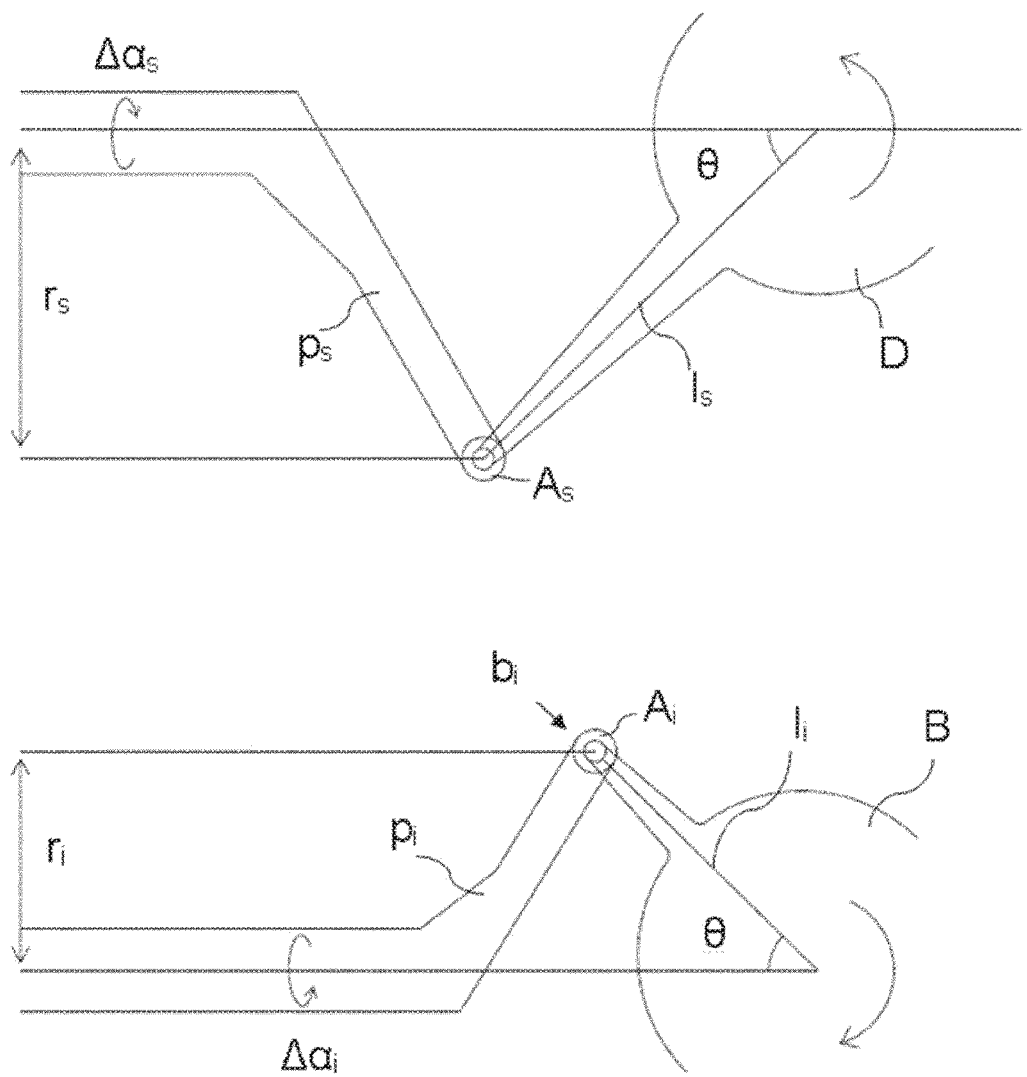
FIG. 2 shows a planar view normal to the axis of the shaft of the rotor showing the respective pitch control levers of the blades of the lower rotor and the upper rotor.

For the general pitch, the translational travels of the plates B and D being the same, one will provide control levers pi for the pitch of the blades of the lower rotor that are shorter than the control levers ps for the pitch of the blades of the upper rotor. In this way, as shown in FIG. 2, the same travel h will provide greater pitch variations $\Delta\alpha i$ on the lower rotor than the pitch variations $\Delta\alpha s$ on the upper rotor.

If ri is the pitch control lever arm of the blades of the lower rotor and rs is the pitch control lever arm of the blades of the upper rotor, one has:

$$H=\Delta\alpha i \cdot ri=\Delta\alpha s \cdot rs \text{ for } \Delta\alpha i \text{ and } \Delta\alpha s <<1,$$

and therefore $$\Delta\alpha i/\Delta\alpha s=rs/ri.$$

For example, if one imposes $\Delta\alpha i=10°-2°=8°$ and $\Delta\alpha s=9°-3°=6°$, then the levers will be sized so that rs/ri=8/6.

For the cyclic pitch, FIG. 2, normal to the axis O of the mast E, shows the pitch control levers pi of the blades of the lower rotor and the pitch control levers ps of the blades of the upper rotor. The pitch control that arrives at the points Ai and As must be located on a line forming an angle $\theta$ with the axis of the blade. This provides a phase advance $\theta$ between the cyclic pitch control and the blade, and ensures that the two rotors have parallel tilts to one another and to the swash plates and therefore that they are not likely to meet.

The swash plates have respective arms with length li for the second plate B and ls for the fourth plate D. The connecting rods bi and bs between the arm end and the pitch lever end are parallel to the axis of the rotor, which causes these two points to be always superimposed in FIG. 2.

The triangles being similar in FIG. 2, one has:

$$ls/rs=li/ri.$$

Figure 3:
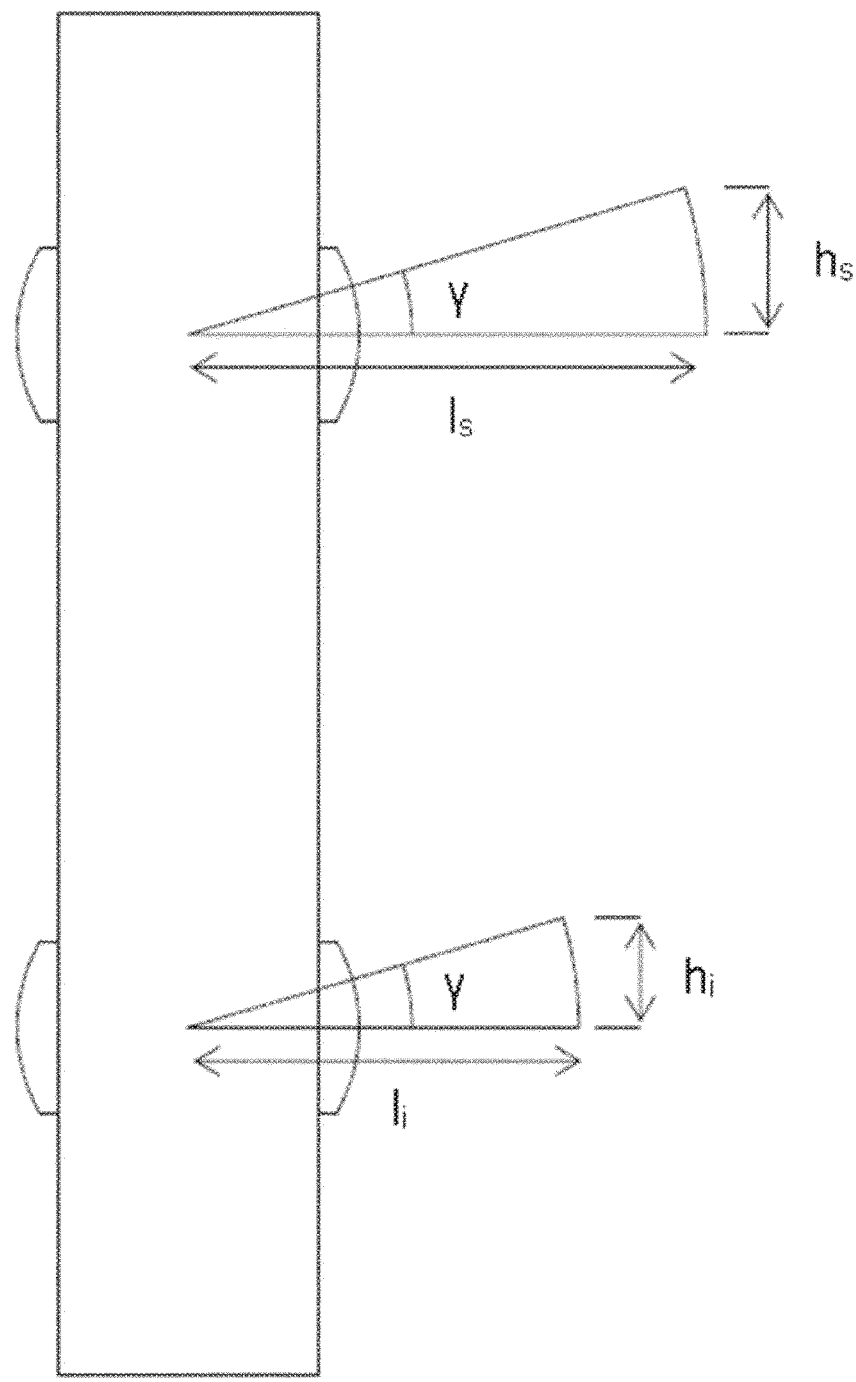
FIG. 3 shows the respective lifts at the end of the arms of the two swash plates.

Furthermore, a same tilt $\gamma$ of the swash plates B and D will provide a lift hs at the end of the arm ls of the swash plate D greater than the lift hi at the end of the arm li of the swash plate B (see FIG. 3).

One therefore has the relationship hs=ls·$\gamma$ and hi=li·$\gamma$ for $\gamma<<1$ (tg$\gamma\sim\gamma$).

However, the variations in angle of attack of the blades $\Delta\alpha i$ and $\Delta\alpha s$ will be equal because $$\Delta\alpha s=hs/rs=ls \cdot \gamma/rs=li \cdot \gamma/ri=hi/ri=\Delta\alpha i,$$

given that ls/rs=li/ri.

This system of swash plates therefore gives a different general pitch lift rate on the blades of the upper and lower rotors, but the same lift rate for the cyclic pitch, which is the desired result.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

| List of reference symbols | |
| --- | --- |
| 1 | Lower rotor |
| 2 | Upper rotor |
| A | First plate (stationary) |
| B | Second plate (cyclic) |
| C | Third plate |
| D | Fourth plate (cyclic) |
| F | Flight controls |
| E | Mast of the rotor |
| O | Axis of the mast |
| H | Translational travel of the plates B and D |
| Ai | Intersection between li and pi (in projection) |
| As | Intersection between ls and ps (in projection) |
| bi | Lower connecting rod between the arm ends and pitch lever ends |
| bs | Upper connecting rod between the arm ends and pitch lever ends |
| hi | Lift at the arm end li |
| hs | Lift at the arm end ls |
| li | Arm of the plate B |
| ls | Arm of the plate D |
| n | Connecting rod between the plates B and C |
| pi | Pitch control lever of the lower rotor blades |
| ps | Pitch control lever of the upper rotor blades |
| ri | Pitch control lever arm of the lower rotor blades |

-continued

List of reference symbols

| | |
|---|---|
| rs | Pitch control lever arm of the upper rotor blades |
| Si | Lower ball joint |
| Ss | Upper ball joint |
| Y | Tilt of the swash plates |
| Δαi | Angular variation of lower rotor blade |
| Δαs | Angular variation of upper rotor blade |
| θ | Angle between the swash plate arm and the axis of the blade |

The invention claimed is:

1. A device for controlling a collective pitch and a cyclic pitch of rotor blades of a rotorcraft of a direct turbine driven type and contra-rotating coaxial rotor type (DTDR), comprising:
   a lower rotor and an upper rotor that are mounted concentrically on a shared rotor shaft;
   a first plate, that is not rotatable, fastened to a structure of the rotorcraft and connected to an actuator configured to communicate collective pitch and cyclic pitch controls to it, the first plate being mounted so as to be movable in translation along the shared rotor shaft and to oscillate relative to the shared rotor shaft, via a lower ball joint mechanism;
   a second plate, that is rotatable, housed on the lower ball joint mechanism so as to be always parallel to the first plate, the second plate being driven in rotation by a member connecting it to the lower rotor and being connected to a pitch control lever of each blade of the lower rotor by a lower connecting rod;
   a third plate and a fourth plate, both rotatable being driven in rotation by a member connecting them to the lower rotor or to the upper rotor and housed on an upper ball joint mechanism so as to be always parallel to one another, the fourth plate being connected to a pitch control lever of each blade of the upper rotor by an upper connecting rod;
   means for ensuring that the third plate is always parallel to the second plate so that the third plate receives a same translation and a same tilt as the second plate by the respective collective pitch and cyclic pitch controls,
   wherein a length of the pitch control levers of the blades of the lower rotor is smaller than a length of the pitch control levers of the blades of the upper rotor, so that a different collective pitch variation on the blades of the upper rotor and on the blades of the lower rotor is ensured.

2. The device according to claim 1, wherein the means for ensuring that the third plate is always parallel to the second plate comprises a plurality of connecting rods equal in length between the second plate and the third plate, and which are parallel to the shared rotor shaft.

3. The device according to claim 2, wherein a number of the connecting rods is at least equal to three.

4. The device according to claim 1, wherein, alternatively, the third plate is connected to the pitch control lever of each blade of the lower rotor by a lower connecting rod.

5. The device according to claim 1, wherein, for a given travel imposed by the collective pitch control, a ratio between a pitch control lever arm of the blades of the upper rotor and a pitch control lever arm of the blades of the lower rotor is greater than one, which corresponds to a maximum angular variation of the pitch of the lower rotor greater than a maximum angular variation of the pitch of the upper rotor.

* * * * *